United States Patent
Miesak (10) Patent No.: US 8,855,150 B2
(45) Date of Patent: Oct. 7, 2014

(54) TILED BRAGG GRATING AND LASER SYSTEMS THEREFROM

(75) Inventor: Edward Miesak, Windermere, FL (US)

(73) Assignee: Lockheed Martin Corporation, Bethesda, MD (US)

( * ) Notice: Subject to any disclaimer, the term of this patent is extended or adjusted under 35 U.S.C. 154(b) by 685 days.

(21) Appl. No.: 12/770,510

(22) Filed: Apr. 29, 2010

(65) Prior Publication Data

US 2011/0268389 A1 Nov. 3, 2011

(51) Int. Cl.
| | | |
|---|---|---|
| *H01S 3/10* | (2006.01) | |
| *H01S 3/13* | (2006.01) | |
| *G02B 6/10* | (2006.01) | |
| *G02B 6/00* | (2006.01) | |
| *G02B 6/34* | (2006.01) | |
| *H01S 3/23* | (2006.01) | |
| *H01S 3/00* | (2006.01) | |

(52) U.S. Cl.
CPC ............... *G02B 6/34* (2013.01); *H01S 3/2308* (2013.01); *H01S 3/005* (2013.01); *H01S 3/0057* (2013.01)
USPC ................ 372/25; 372/30; 385/129; 385/147

(58) Field of Classification Search
USPC ......... 385/37, 129, 147; 359/333, 337–337.5, 359/566–576; 372/5, 6, 25, 30, 33, 50.11
See application file for complete search history.

(56) References Cited

U.S. PATENT DOCUMENTS

| | | | |
|---|---|---|---|
| 5,691,989 A | 11/1997 | Rakuljic et al. | |
| 7,394,842 B2 * | 7/2008 | Glebov et al. | 372/102 |
| 7,424,185 B2 * | 9/2008 | Glebov et al. | 385/37 |
| 7,444,049 B1 * | 10/2008 | Kim et al. | 385/37 |
| 7,609,743 B2 * | 10/2009 | Glebov et al. | 372/92 |
| 2011/0038390 A1 * | 2/2011 | Rudd et al. | 372/25 |

OTHER PUBLICATIONS

Terrance J. Kessler, et al. 2004, "Demonstration of Coherent Addition of Multiple Gratings for High-Energy Chirped-Pulse-Amplified Lasers", Optics Letters, vol. 29, No. 6.

Govind P. Agrawal, 1995, "Nonlinear Fiber Optics", Academic, San Diego, California.

* cited by examiner

*Primary Examiner* — Uyen Chau N Le
*Assistant Examiner* — John M Bedtelyon
(74) *Attorney, Agent, or Firm* — Terry M. Sanks, Esq.; Beusse Wolter Sanks & Maire, P.A.

(57) ABSTRACT

A tiled Bragg grating (BG) includes a plurality of BGs that are paralleled and optically contacted to one another. Each BG includes an optically transparent substrate within a predetermined wavelength or wavelength range having a length dimension and a transverse dimension. The BGs have a grating period along their length dimension. The BGs have optical contact regions along edges in their transverse dimension where the BGs are optically contacted to one another.

20 Claims, 7 Drawing Sheets

TILED BRAGG GRATING AND LASER SYSTEMS THEREFROM

FIELD

Disclosed embodiments relate generally to Bragg gratings and high power light emitting systems including chirped-pulse amplifier lasers.

BACKGROUND

In amplification of ultrashort optical pulses (e.g., femtosecond, i.e. $10^{15}$ second range pulse width), the optical peak intensities that occur can become very high, so that detrimental nonlinear pulse distortion or even destruction of the gain medium or of some other optical element may occur. This can be prevented by employing a method known as chirped-pulse amplification (CPA).

In CPA, before passing through the amplifier medium of the amplifier, the pulses are "chirped" to provide temporary stretching to a much longer pulse duration by a strongly dispersive element (referred to as the pulse stretcher, e.g., a grating pair used with a telescope or a long fiber). As known in the art, an ultrashort light pulse necessarily has a broad spectral bandwidth by virtue of the uncertainty principle.

The pulse stretcher possesses a wavelength-dependent optical path length, so that different wavelength components have differing transit times through the pulse stretcher. Thus, an ultrashort light pulse becomes spread in time, often by a factor of 10,000 times or more. For example, a 10 fs light pulse can emerge from a pulse stretcher with a time duration of >100 picoseconds. Stretching thus reduces the peak pulse power to a level where the above-mentioned detrimental effects in the gain medium are avoided, or at least minimized. The stretched pulse still possesses the frequency spectrum necessary for a much-shorter pulse.

After the optical pulses exit the gain medium, a dispersive compressor is used, i.e., an element with opposite dispersion (typically a grating pair) that has wavelength-dependent optical path length that largely "undoes" the effect of the stretcher, regaining an ultrashort pulse having a pulse duration similar to the input pulse duration with dramatically higher peak power than was present in the amplifier system itself.

One strongly dispersive element is a Bragg grating (BG). Unlike a surface grating which is a 2 dimensional gating that is analogous to a metal mirror, a Bragg grating is a three dimensional grating, often having an interaction length that can be 1 cm or more. BGs can have a constant grating period, or a variable grating period. BGs having a constant grating period wavelength can be used for wavelength locking, for example. The BG can be embodied as a volume BG, a fiber BG, or a waveguide BG.

In the case of a variable grating period, the BG is referred to as a chirped BG. Used in a CPA application, a single chirped BG can replace both the pulse stretcher and compressor, providing stretching and compressing. The path of the pulse through the chirped BG's grating determines whether the pulse is stretched or compressed. The single chirped BG embodiment provides the laser system a significant reduction in volume, less weight, easier alignment and maintenance, lower sensitivity to vibration, and significant cost reduction.

Figure 1A:
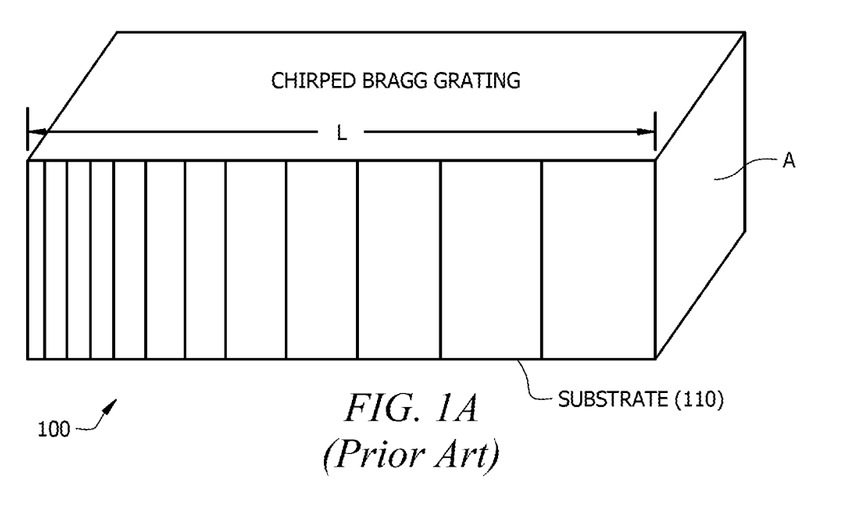
FIG. 1A shows a depiction of a conventional single chirped volume Bragg grating.

FIG. 1A shows a depiction of a conventional single chirped BG 100 comprising an optically transparent substrate 110 that is optically transparent within a predetermined wavelength or wavelength range. Chirped BG 100 has a length dimension that the optical beam traverses and interacts therewith, shown as L, and a transverse (cross sectional area defining) dimension shown as A. The chirped BG 100 may be fabricated using a photorefractive glass that has an altered refractive index in areas that have been exposed to UV light.

Figure 1B:
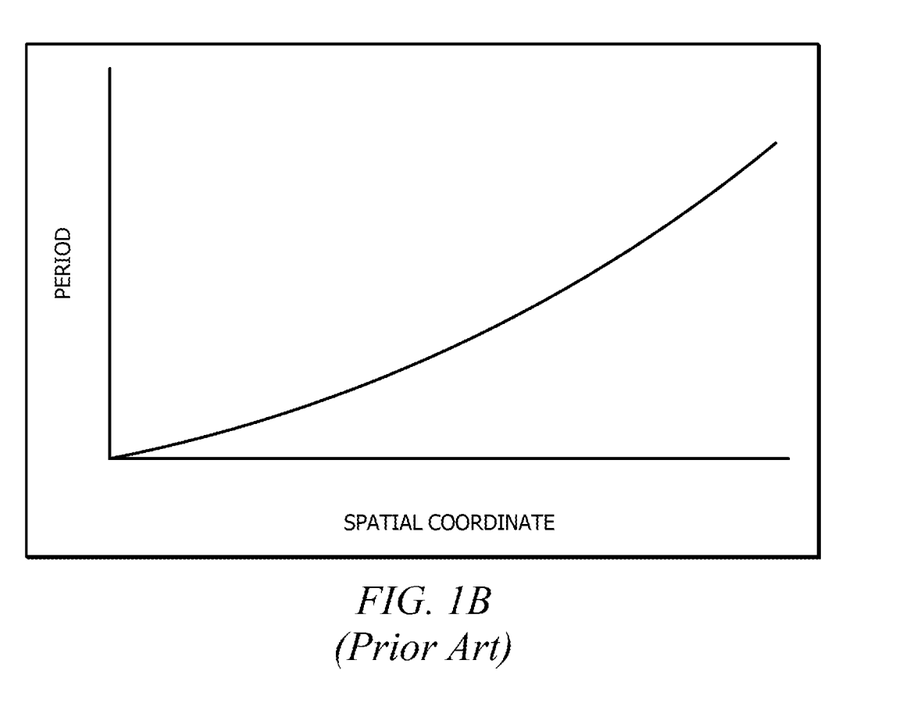
FIG. 1B shows the spatial coordinate when the Bragg grating varies along the spatial axis as shown in FIG. 1A.

FIG. 1B shows the spatial coordinate when the period of the BG 100 varies monotonically along the spatial axis as shown in FIG. 1A.

BGs are available in relatively large cross-sectional sizes as compared to the other BGs (e.g., fiber, waveguide), such as a maximum of about 5 mm×5 mm. This maximum cross sectional area is limited by material defects. However, since the peak power becomes very high during compression, the power of the chirped BG comprising laser system is limited by the chirped BG to about <0.5 mJ/pulse to avoid optical damage. Similarly, for high power laser applications that involve constant period BGs, such as for wavelength locking, the BG can limit the power that can be used in the laser system.

SUMMARY

Disclosed embodiments describe tiled BGs that comprise a plurality of BGs that are paralleled and optically contacted to one another. The Inventor has recognized that to handle pulse energies >1 mJ/pulse, such as for applications including long range applications, the optically transparent substrate (e.g. glass) needs to be larger in cross sectional area because the laser beam spot size has to be larger to reduce beam intensity to avoid optical damage. However, as described above, the area of the glass cannot be made larger than about 5 mm on a side due to defectivity considerations. As described herein, multiple BGs are paralleled and optically contacted to make one large area tiled BG to provide a large aperture, that can be sized to meet a given application by configuring with an appropriate number of BGs.

Each BG comprises an optically transparent substrate within a predetermined wavelength or wavelength range having a length dimension and a transverse dimension, and a grating period along the length dimension. The BGs have optical contact regions along their edges in the transverse dimension where they are optically contacted to one another.

DETAILED DESCRIPTION

Disclosed embodiments in this Disclosure are described with reference to the attached figures, wherein like reference numerals are used throughout the figures to designate similar or equivalent elements. The figures are not drawn to scale and they are provided merely to illustrate the disclosed embodiments. Several aspects are described below with reference to example applications for illustration. It should be understood that numerous specific details, relationships, and methods are set forth to provide a full understanding of the disclosed embodiments. One having ordinary skill in the relevant art, however, will readily recognize that the subject matter disclosed herein can be practiced without one or more of the specific details or with other methods. In other instances, well-known structures or operations are not shown in detail to avoid obscuring structures or operations that are not well-known. This Disclosure is not limited by the illustrated ordering of acts or events, as some acts may occur in different orders and/or concurrently with other acts or events. Furthermore, not all illustrated acts or events are required to implement a methodology in accordance with this Disclosure.

Notwithstanding that the numerical ranges and parameters setting forth the broad scope of this Disclosure are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5.

Figure 2:
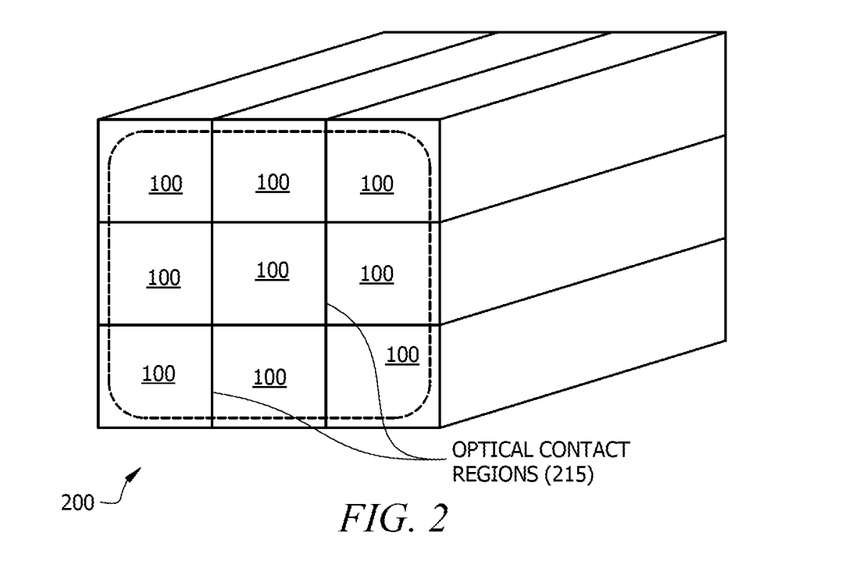
FIG. 2 shows a depiction of an exemplary tiled chirped BG, comprising a plurality of chirped BGs that are paralleled and optically contacted to one another, according to a disclosed embodiment.

FIG. 2 shows a depiction of an exemplary tiled BG 200, shown comprising a plurality of chirped BGs 100 that are paralleled and optically contact one another, according to a disclosed embodiment. Although shown as comprising a plurality chirped BGs 100, the tiled BG 200 can comprise a plurality of constant grating period BGs, such as for locking a laser to a specific wavelength, for example.

The respective BGs 100 along the periphery of the tiled BG 200 have dashed lines shown along their outer periphery to depict surfaces that are not subject to surface preparation processing, such as polishing or cutting then polishing, where outside the dashed lines the BGs 100 may not be well behaved due to edge effects generally present in fabricated optics. For example, the gratings may not extend all the way to the outer transverse edges of the optically transparent (e.g., glass) substrates 110. This can be determined before the tiled BG 200 is fabricated. One way to determine the extent of the grating present in the substrates 110 would be to use a laser beam that is reflected by the BG 100. The beam can be expanded to a spot size larger than the BG 100 and the beam can then shine on the BG 100 with a screen after the BG 100. Viewing the image results on the screen will show how much of the light is reflected all the way out to the transverse edges of the BG 100.

The transverse dimension edges of the BGs 100 that are optically contacted to one another along the optical contact regions 215 shown. The optical contact regions 215 although always present are generally almost imperceptible seams, so that it would generally be difficult to distinguish the tiled BG 200 from one large single piece of the same material. As known in the art, optical contacting can be performed with or without an adhesive, but the surfaces to be optically contacted are generally carefully prepared before optically contacting.

The BGs 100 have a variable grating period that varies along their length dimension as depicted in FIG. 1A. Optically contacting BGs to form tiled BGs as disclosed herein can use standard optics joining procedures modified including surface preparation processing, such as polishing or cutting then polishing, of the transverse edges of the substrate in the optically contacted regions as described below in more detailed with respect to the exemplary sequence of assembly steps described below relative to FIGS. 3A-D. Briefly, a plurality of BGs having polished or cut then polished transverse edges are optically contacted to form a plate, and then a plurality of plates are optically contacted together.

Although tiled BG 200 is shown in a 3×3 arrangement of BGs 100, the number of BGs in each transverse direction that define the cross sectional dimension is at least 2 and can generally be any number ≥2. Although tiled BG 200 is shown having a square cross section, tiled BGs need not have a square cross section. In one example, if (i) the BGs comprise chirped volume BGs, (ii) the dimensions of each chirped volume BG is 5 mm×5 mm×100 mm (length dimension), (iii) each chirped volume VBG has sufficient cross sectional dimension sufficient to handle pulses having energies ≤0.5 mJ, and (iv) the pulse energy for an intended application is 50 mJ, a 10×10 tiled chirped volume BG array according to an embodiment of the invention will provide a 100× increase in cross sectional dimension, and a pulse handing capability of 50 mJ as a result.

Figure 3A:
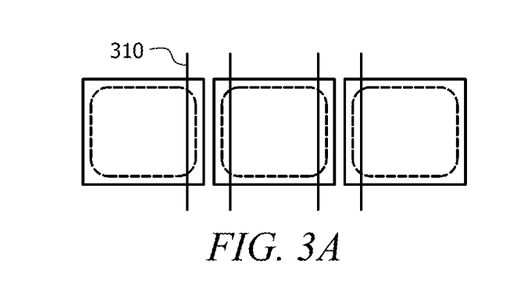
FIG. 3A-D show an exemplary sequence of assembly steps including polishing or cutting and polishing and optically contacting chirped BGs to provide a plurality of paralleled chirped BGs to provide a tiled chirped BG that provides an increased cross sectional area, according to a disclosed embodiment.
Figure 3B:
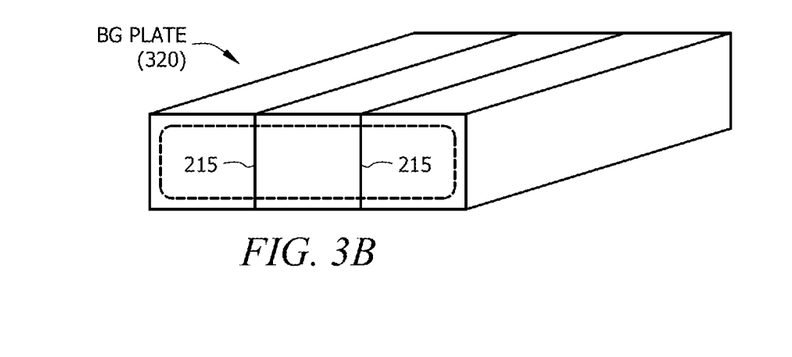
Figure 3C:
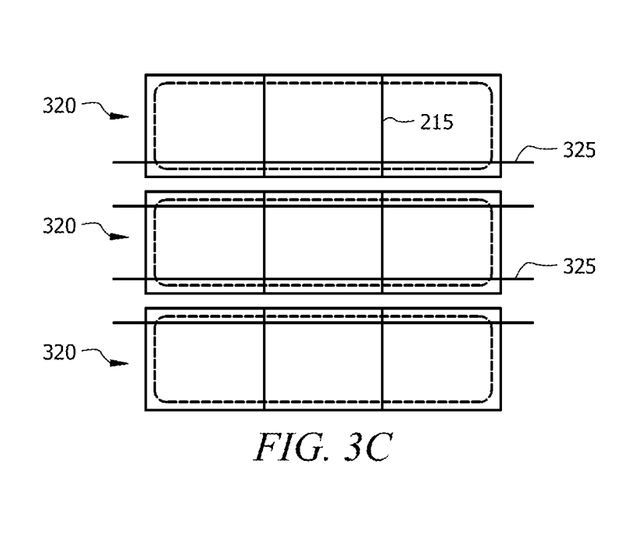
Figure 3D:
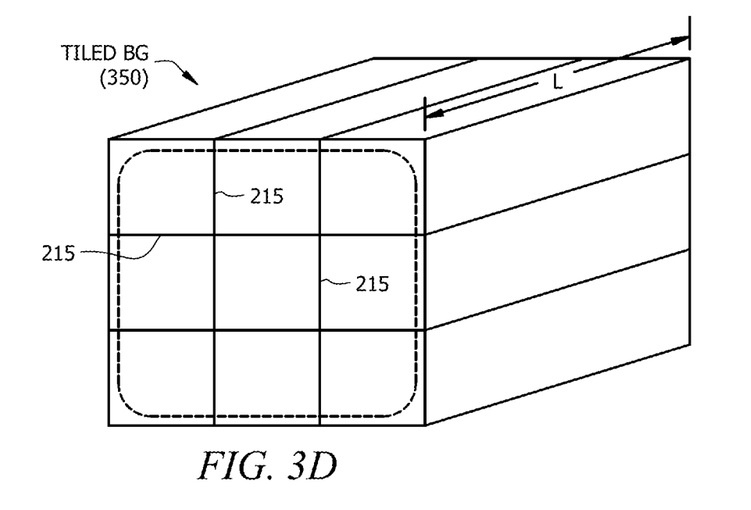

FIGS. 3A-D shows an exemplary sequence of assembly steps including polishing or cutting and polishing along lines and optically contacting to provide a plurality of BGs in parallel to provide a tiled BG, according to a disclosed embodiment. A plurality of essentially identical BGs are obtained. BGs can generally be obtained commercially, such as chirped volume BGs having a maximum cross sectional area of about 5 mm×5 mm, and a length up to a few inches. FIG. 3A shows polishing lines or cut and polishing lines 310 that define the transverse edges of the BGs that result after polishing or cutting and polishing. FIG. 3B shows the BGs optically contacted to form optical contact regions 215 to form a BG plate 320. FIG. 3C shows polishing lines or cut and polishing lines 325 that define the transverse edges of the BG plates 320 that result after polishing or cutting and polishing. FIG. 3D shows a tiled BG 350 formed by paralleling and optically contacting together a plurality of BG plates 320.

Figure 4:
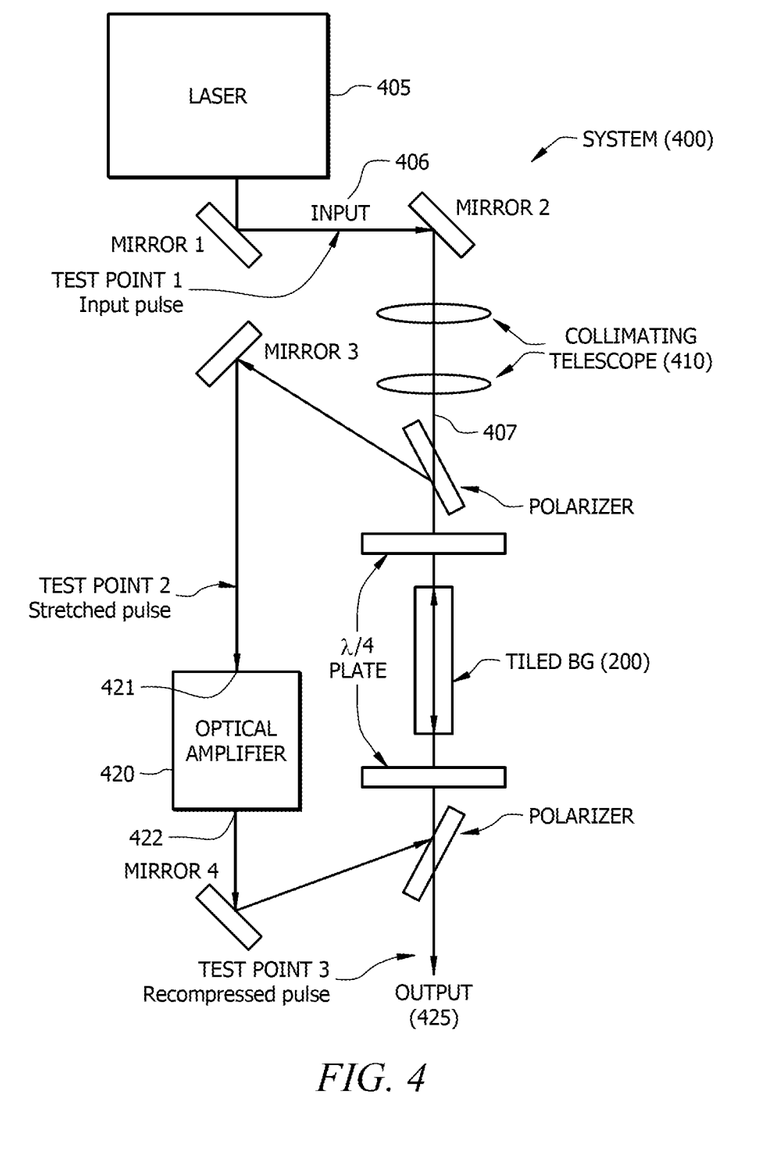
FIG. 4 shows an exemplary femtosecond laser system employing CPA comprising a laser source, an optical amplifier, and a tiled chirped BG that provides both pulse stretching and compression, according to a disclosed embodiment.

FIG. 4 shows an exemplary femtosecond laser system 400 employing CPA comprising a laser source 405, an optical amplifier 420, and a tiled chirped BG 200 that provides both pulse stretching and compression, according to a disclosed embodiment. Laser source 405 can comprise as a master laser oscillator (e.g., Mira Optima 900-F, Coherent, Inc.) that provides input pulses for system 400 having initial pulse duration (width; typically measured at fwhm). The input pulses are femtosecond input pulses that can have an energy >10 mJ/pulse. System 400 includes a collimating telescope 410 upon which the input pulses 406 are incident for expanding the input pulses 406. The collimated input pulse 407 output by the collimating telescope 410 is incident on a first end of the tiled chirped BG 200 that results in the tiled chirped BG 200 stretching the collimated input pulse 407 to provide stretched pulse duration pulses, such as about 1,000 times or more longer as compared to width of the input pulse 406. The pulse length of the stretched pulse is about proportional to the length (L) of the tiled BG 200 multiplied by its index of refraction and the number of passes (n).

The stretched pulses are directed to optical amplifier 420. Optical amplifier 420 has a gain medium and an amplifier input 421 and an amplifier output 422 that provides amplified stretched pulses. The amplified stretched pulses are directed to tiled chirped BG 200 by a collimating telescope (not shown) to a second end of the tiled chirped BG 200 for compressing the stretched pulse duration pulses to a pulse duration similar to a pulse duration for the input pulses 406. The output of system 400 is shown as 425.

Notably, in system 400, the tiled chirped BG 200 avoids certain difficulties because it provides two functions during operation of system 400, one in the "forward" direction (stretching the pulses) and one in the "backward" direction (compressing the pulses). In one embodiment described below relative to FIG. 5, using the tiled chirped BG 200 for both stretching and compressing acts to cancel distortions (e.g., defects) that exist in the tiled chirped BG 200 structure itself.

Figure 5:
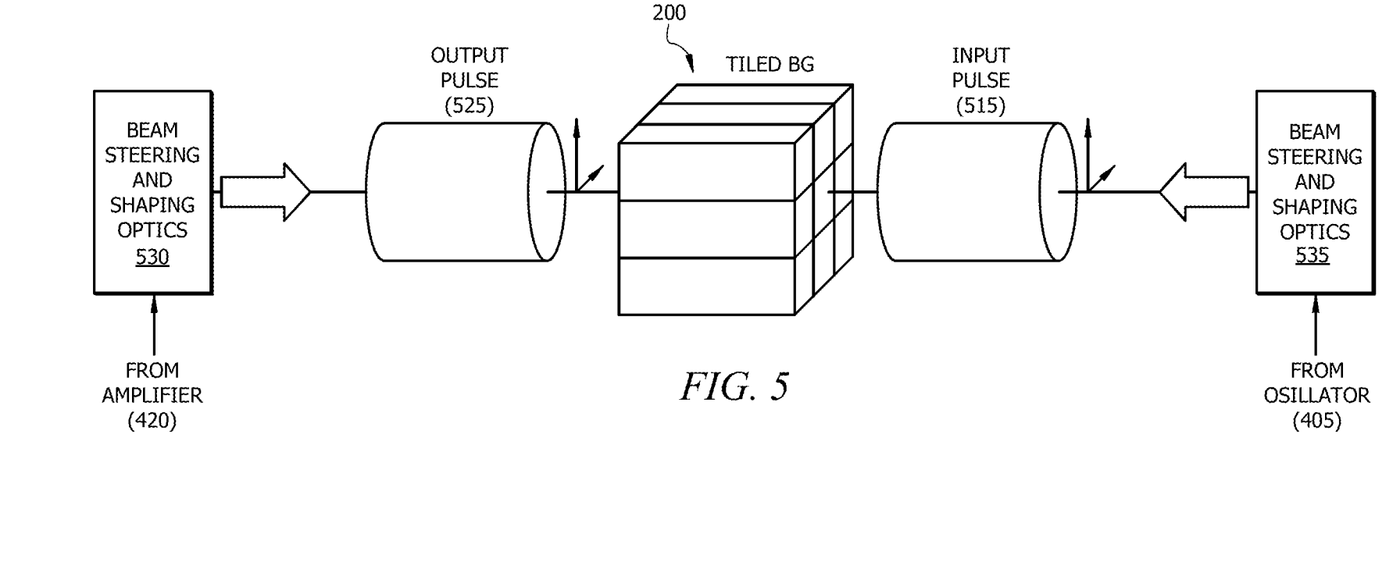
FIG. 5 shows a depiction of a tiled BG that directs the input pulses (to be stretched) and the output pulses (to be compressed) that are substantially the same spot size through the substantially same pathway through the tiled BG, according to a disclosed embodiment.

FIG. 5 shows a depiction of a tiled BG that directs the input pulses 515 (to be stretched) and the output pulses 525 (to be compressed) through substantially the same pathway through the tiled BG 200. The input pulse 515 is the one being stretched, coming from an oscillator such as laser 405 shown in FIG. 4, shown in FIG. 4 as collimated input pulse 407. The input pulse is incident on the tiled chirped BG 200 with a particular orientation and has a beam spot size. This is designated in FIG. 5 with two arrows in perspective. When the pulse comes out of the tiled chirped BG 200 it is a stretched pulse that goes through an amplifier chain, such as optical amplifier 420 shown in FIG. 4, which after amplification the stretched pulse shown as an output pulse 525 enters the tiled chirped BG 200 from its other side for pulse compression.

Beam steering and shaping optics 530 and 535 are used so that the output pulse has substantially the same beam spot size and substantially the same orientation as the input pulse as depicted in FIG. 5. Providing substantially the same beam spot size and substantially the same orientation has been recognized by the Inventor to improve performance out of the tiled chirped BG 200 stretcher/compressor by providing path matching. Path matching allows the same parts of the pulse to go through the same parts of the tiled chirped BG 200 for stretching and compression which acts to cancel distortions. As used herein, "substantially the same" beam spot size and "substantially the same" orientation both refer to the input pulse 515 and the output pulse 525 being as close as possible for these parameters, and within 10% of one another, typically within 1 to 5% of one another.

Applications for tiled BGs as disclosed herein are numerous, and include applications for light-emitting devices such as solid-state lasers, semiconductor laser diodes, gas and ion lasers, and the like. In one application, energetic femtosecond (fs) lasers providing minimum usable pulse energy of 0.05 J and higher can be ruggedized and miniaturized for use in new products to great advantage over existing lasers. As noted above, fs lasers generally require a pulse stretcher and a separate pulse compressor. Such fs laser systems are large systems requiring stable, precision mechanical mounts for each of the optical components inside. Using a tiled chirped BG disclosed herein it is possible to replace these two systems (pulse stretcher and pulse compressor) with a single tiled BG stretcher/compressor that is no more than about a few inches long.

EXAMPLES

Disclosed embodiments of the invention are further illustrated by the following specific Examples, which should not be construed as limiting the scope or content of this Disclosure in any way.

Figure 6A:
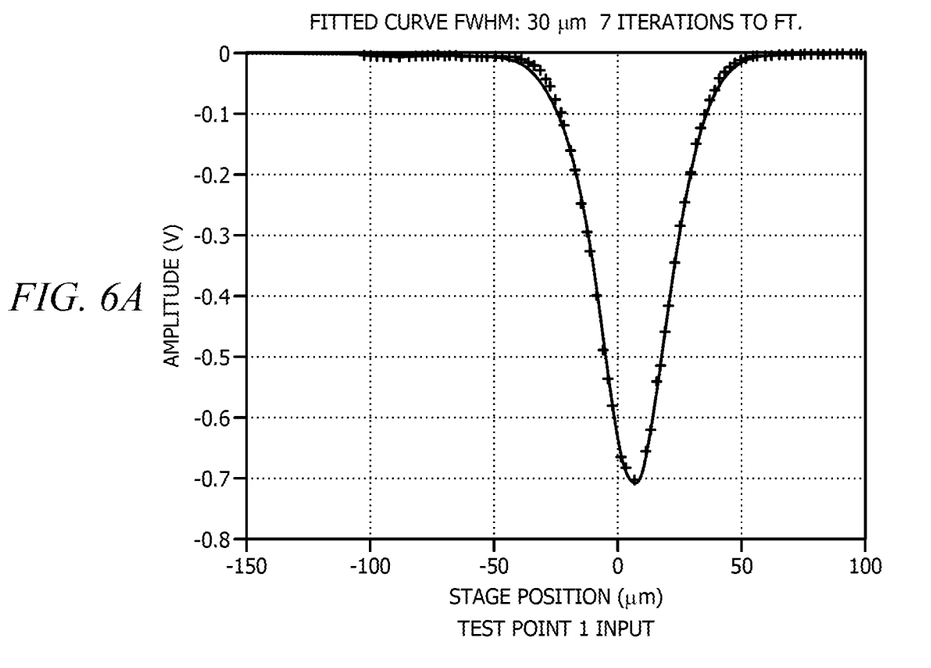
FIGS. 6A-C shows data obtained from the laser system shown in FIG. 4 at test point 1 (input), test point 2 (stretched pulse), and test point 3 (recompressed pulse), according to a disclosed embodiment.
Figure 6B:
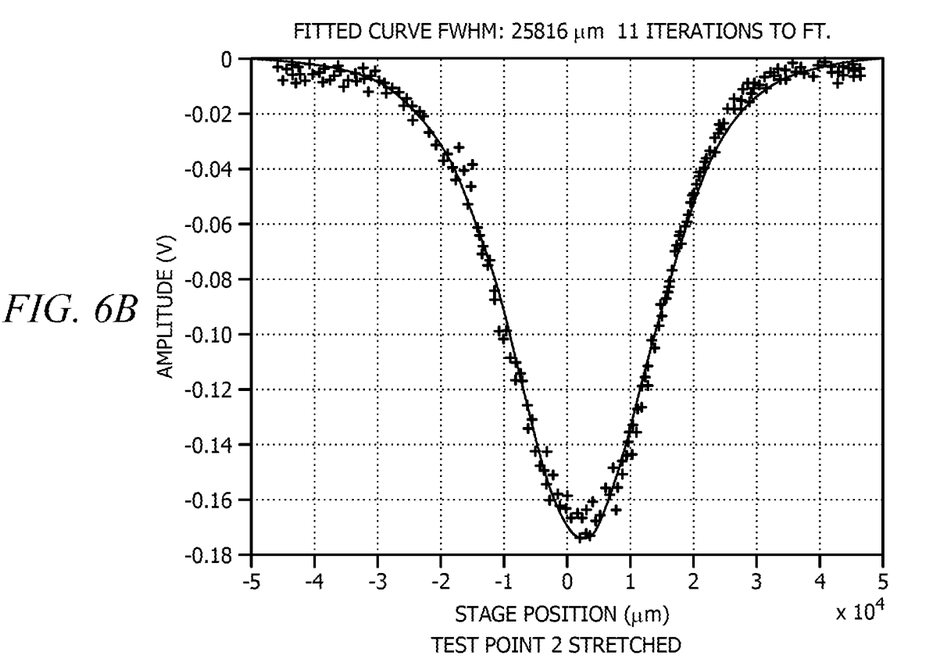
Figure 6C:
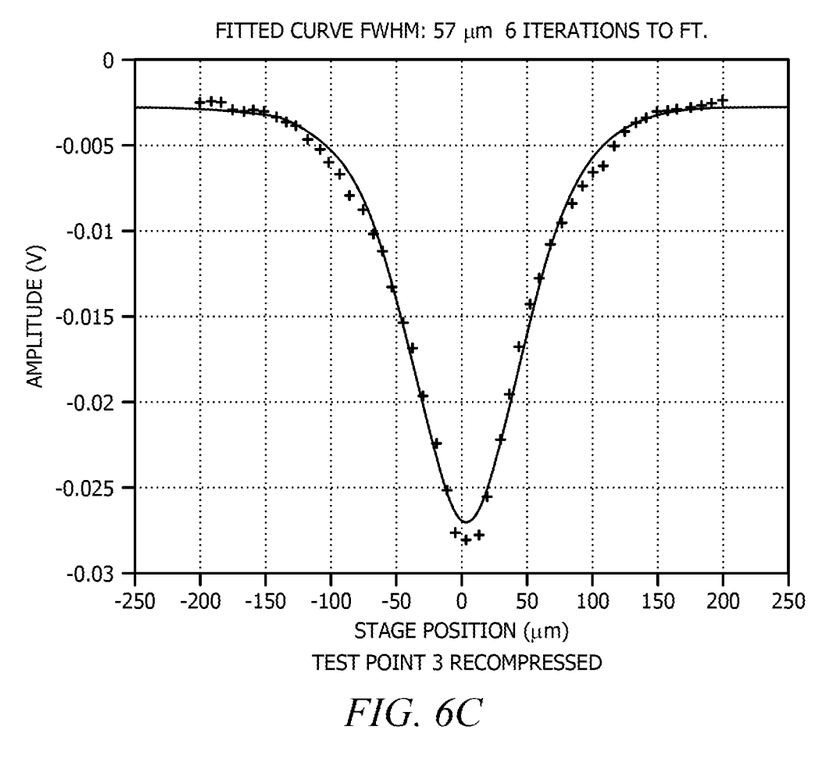

FIGS. 6A-C show measured data obtained from a laser system resembling system 400 shown in FIG. 4 using an autocorrelator at test point 1 (input pulse), test point 2 (stretched pulse), and test point 3 (recompressed pulse), according to an embodiment of the invention. The measurements made were made without an amplifier in place so no gain was demonstrated. The measurements were performed using a single BG. The initial pulse width at test point 1 was measured to be ~141 fs (fwhm), the stretched pulse width at test point 2 was measured to be 126 ps (fwhm), and the recompressed pulse width at test point 3 was measured to be 396 fs (fwhm). The input power provided by the oscillator was about 0.4 Watts and the output power was about 0.2 Watts. Good results were obtained with a highest error percentage of ~5% with respect to the average value between multiple measurements. Moreover, other tests with a tiled BG as disclosed herein demonstrated insensitivity to alignment along the length of the BGs. The tolerance of the spacing that was demonstrated to be ± several hundred μm (±about 0.015").

While various disclosed embodiments have been described above, it should be understood that they have been presented by way of example only, and not limitation. Numerous changes to the subject matter disclosed herein can be made in accordance with this Disclosure without departing from the spirit or scope of this Disclosure. In addition, while a particular feature may have been disclosed with respect to only one of several implementations, such feature may be combined with one or more other features of the other implementations as may be desired and advantageous for any given or particular application.

Thus, the breadth and scope of the subject matter provided in this Disclosure should not be limited by any of the above explicitly described embodiments. Rather, the scope of this Disclosure should be defined in accordance with the following claims and their equivalents.

The terminology used herein is for the purpose of describing particular embodiments only and is not intended to be limiting. As used herein, the singular forms "a," "an," and "the" are intended to include the plural forms as well, unless the context clearly indicates otherwise. Furthermore, to the extent that the terms "including," "includes," "having," "has," "with," or variants thereof are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art to which embodiments of the invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The invention claimed is:
1. A tiled Bragg grating (BG), comprising:
 a plurality of BGs paralleled and optically contacted to one another to limit at least one of material defects realized for each individual BG and energy threshold for each

BG compared to a single BG having a same size as the plurality of BGs optically contacted to one another, each said BG comprising:
an optically transparent substrate within a predetermined wavelength or wavelength range having a length dimension and a transverse dimension perpendicular to the length dimension;
a grating period along said length dimension, and
optical contact regions along edges of the BG in said transverse dimension where said BGs are optically contacted to one another along the optical contact regions, wherein said optical contact regions extend between said BGs in the length dimension and wherein said optical contact regions are imperceptible seams such that the plurality of BGs are optically indistinguishable from a single-piece of the optically transparent substrate.

2. The tiled BG of claim 1, wherein said grating period is constant along said length. dimension.

3. The tiled BG of claim 1, wherein said plurality of BGs comprise fiber BGs.

4. The tiled BG of claim 1, wherein said optical contact regions are configured such that a combined energy threshold of the tiled BG is a product of the energy threshold of each BG and the number of BGs optically contacted to one another.

5. The tiled BO of claim 4, wherein the combined energy threshold of the tiled BG is at least 10 mJ/pulse and wherein the respective energy threshold of each BG is at least 0.5 mJ/pulse.

6. The tiled BG of claim 1, wherein said grating period varies along said length dimension and said plurality of BGs are chirped BGs.

7. The tiled Bragg grating of claim 1, wherein said optically transparent substrates comprise photo-thermo-refractive (PTR) glass.

8. The tiled BG of claim 1, wherein each BG includes an outer periphery in the transverse dimension configured to be independent of the optically transparent substrate being positioned within the outer periphery.

9. A tiled Bragg grating (BG), comprising:
a plurality of chirped BGs paralleled and optically contacted to one another to limit at least on of material defects realized for each individual BG and energy threshold for each BG compared to a single BG having a same size as the plurality of BGs optically contacted to one another, each said chirped BG comprising:
an optically transparent substrate within a predetermined wavelength or wavelength range having a length dimension and a transverse dimension perpendicular to the length dimension;
a grating period that varies along said length dimension, and
optical contact regions along edges in said transverse dimension where said plurality of BGs are optically contacted to one another along the optical contact regions, wherein said optical contact regions extend between a first end and a second end of the BGs, said first end and said second end separated along the length dimension and wherein said optical contact regions are imperceptible seams such that the plurality of BGs are optically indistinguishable from a single-piece of the optically transparent substrate.

10. The tiled BG of claim 9, wherein said plurality of chirped BGs comprise chirped volume BGs.

11. A laser system, comprising:
a laser source that provides input pulses having an input energy and an input pulse duration, and an optical amplifier having a. gain medium, an amplifier input and an amplifier output, and a tiled Bragg grating (BG) comprising a plurality of BGs paralleled and optically contacted to one another to limit at least one of material defects realized for each individual BG and threshold for each BG compared to a single BG having a same size as the plurality of BGs optically contacted to one another, each said BG comprising:
an optically transparent substrate within a predetermined wavelength or wavelength range having a length dimension and a transverse dimension perpendicular to the length dimension, said optically transparent substrate having an energy threshold less than the pulse input energy;
a grating period that varies along said length dimension, and
optical contact regions along edges in said transverse dimension Where said plurality of BGs are paralleled and optically contacted to one another along the optical contact regions, wherein said optical contact regions are imperceptible seams such that the plurality of BGs are optically indistinguishable from a single-piece of the optically transparent substrate and wherein the transverse dimension of the optically contacted BGs is greater than a minimum spot size of the input pulses such that a combined energy threshold of the plurality of BGs is greater than the pulse input energy to avoid optical damage to the tiled BG,
wherein said input pulses are coupled to a first end of said tiled BG for stretching said input pulse duration to provide stretched pulses having a stretched pulse duration, said tiled BG is configured such that the input pulses are coupled to the first end to traverse in the length dimension of the tiled BG,
wherein said stretched pulses are coupled to said amplifier input, and wherein said amplifier output provides amplified stretched pulses, and
wherein said amplified stretched pulses from said amplifier output is coupled to a second end of said tiled BG opposite to said first end for compressing said amplified stretched pulses, said tiled BG providing a recompressed pulsed output having recompressed pulses having a recompressed pulse duration that is similar to said input pulse duration of said input pulses, said tiled BG is configured such that the amplified stretched pulses are coupled to the second end to traverse in the length dimension of the tiled BG.

12. The laser system of claim 11, further comprising first beam shaping and steering optics between said laser source and said first end of said tiled BG for steering and shaping said input pulses to provide a first orientation and first spot size when said input pulses are incident on said first end of said tiled BG, and second beam shaping and steering optics between amplifier output said second end of said tiled BG for steering and shaping said amplified stretched pulses to provide a second orientation and second spot size when said amplified stretched pulses are incident on said second end of said tiled BG.

13. The laser system of claim 11, wherein said second orientation is substantially the same as said first orientation and said second spot size is substantially the same as said first spot size.

14. The laser system of claim 11, wherein said laser source comprises a master laser oscillator.

15. The laser system of claim 11, wherein said optically transparent substrates comprise photo-thermo-refractive (PTR) glass.

16. The laser system of claim 11, wherein said plurality of BGs comprise fiber BGs.

17. The laser system of claim 11, wherein said plurality of BGs comprise volume BGs.

18. The laser system of claim 11, wherein, said BGs comprise Bragg waveguide gratings.

19. The laser system of claim 11, wherein said input pulses are femtosecond input pulses with the input energy being >10 mJ/pulse and said recompressed. pulse duration of said recompressed pulsed output provides femtosecond recompressed pulses.

20. The laser system of claim 11, wherein the input energy is >10 mJ/pulse, wherein the optical contact regions are configured such that the combined energy threshold of the plurality of BGs is a product of the energy thresholds of each BG and the number of BGs optically contacted to one another.

* * * * *

UNITED STATES PATENT AND TRADEMARK OFFICE
CERTIFICATE OF CORRECTION

PATENT NO.        : 8,855,150 B2                                                Page 1 of 1
APPLICATION NO.   : 12/770510
DATED             : October 7, 2014
INVENTOR(S)       : Edward Miesak

It is certified that error appears in the above-identified patent and that said Letters Patent is hereby corrected as shown below:

In the Claims

Column 7, claim 9, line 42, delete "on" and insert --one--;

Column 8, claim 11, line 5, delete "detects" and insert --"defects"--; and insert --energy-- between "and" and "threshold.".

Signed and Sealed this
Third Day of February, 2015

Michelle K. Lee
*Deputy Director of the United States Patent and Trademark Office*